United States Patent
Stevenson

(10) Patent No.: US 7,487,865 B2
(45) Date of Patent: Feb. 10, 2009

(54) METHOD OF CONTROLLING A TORQUE-TRANSMITTING MECHANISM AND CLUTCH CAPACITY CONTROL SYSTEM

(75) Inventor: Paul D. Stevenson, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 345 days.

(21) Appl. No.: 11/285,680

(22) Filed: Nov. 21, 2005

(65) Prior Publication Data

US 2007/0114106 A1    May 24, 2007

(51) Int. Cl.
*F16D 25/06* (2006.01)

(52) U.S. Cl. .............................. 192/106 F; 192/85 AA

(58) Field of Classification Search ............... 192/52.4, 192/85 R, 85 AA, 86, 106 F; 475/146

See application file for complete search history.

(56) References Cited

U.S. PATENT DOCUMENTS

| | | | |
|---|---|---|---|
| 5,950,787 A * | 9/1999 | Murasugi et al. | 192/85 AA |
| 6,595,339 B1 | 7/2003 | Bauknecht et al. | 192/85 |
| 6,684,995 B1 * | 2/2004 | Page | 192/85 AA |

* cited by examiner

*Primary Examiner*—Charles A Marmor
*Assistant Examiner*—Derek D Knight

(57) ABSTRACT

A method of controlling a torque-transmitting mechanism in a multi-speed transmission includes providing structure forming a pressurizable reaction chamber at a reaction surface of an apply piston opposing an apply surface of the piston. The reaction chamber is pressurized to a first pressure during engagement of the torque-transmitting mechanism to establish a first speed ratio and a first torque capacity. The reaction chamber is pressurized to a second pressure level during engagement of the torque-transmitting mechanism to establish a second speed ratio and a second torque capacity. Thus, because pressure in the reaction chamber may be controllably varied, a greater reaction pressure is established during the second speed ratio, allowing a greater apply pressure level to be used to establish the second torque capacity. A clutch capacity control system is also provided that allows better control of torque-transmitting mechanisms engagable in different speed ratios to establish different torque capacities.

11 Claims, 3 Drawing Sheets

METHOD OF CONTROLLING A TORQUE-TRANSMITTING MECHANISM AND CLUTCH CAPACITY CONTROL SYSTEM

TECHNICAL FIELD

The invention relates to torque-transmitting mechanisms in multi-speed transmissions. Specifically, the invention relates to control of torque capacity in torque-transmitting mechanisms.

BACKGROUND OF THE INVENTION

Modern multi-speed transmissions utilize torque-transmitting mechanisms such as rotating type clutches and stationary clutches to transfer torque at various speed ratios through the transmission. Frequently, a torque-transmitting mechanism may be engaged in more than one fixed speed ratio (sometimes referred to as a gear ratio), i.e., the torque-transmitting mechanism is reused in the engagement schedule of the transmission. In these cases, a different torque capacity (also referred to as clutch capacity) is often required for the torque-transmitting mechanism in one gear ratio than in the other. For example, in a lower gear ratio, higher torque capacity is generally required at the engaged clutch than in a higher gear ratio. Torque-transmitting mechanisms must be designed to handle the maximum required torque capacity. This quality is referred to as the torque capacity of the clutch. When the ratio of the torque capacity for the torque-transmitting mechanism in the gear ratio requiring the maximum capacity divided by the torque capacity needed in the gear ratio required the minimum torque capacity exceeds about 3.0, it becomes challenging to control the apply and release of the torque-transmitting mechanism in the gear ratio with the lower torque capacity. Because the apply pressure will be about one-third or less of the apply pressure in the gear ratio requiring the maximum apply pressure, factors such as the tolerance on a return spring for the apply piston (i.e., the minimum force necessary to compress the return spring) affect the control of the torque-transmitting mechanism. For instance, the tolerance on the return spring may become a significant percentage of the total force on the apply piston necessary to move and engage the torque-transmitting mechanism in the gear ratio with the lower torque capacity. Additionally, the apply pressure on the piston may be so low in the gear ratio with the lower torque capacity that rotating shaft seals on the piston may not be sufficiently seated, producing a variable leak and thus compromising control of the torque-transmitting mechanism. Drag of the piston seal may also become a high percentage of the total force required to move the apply piston in the lower torque capacity instance. Change in the force of the return spring with stroke of the apply piston may also become a significant percentage of the total force on the torque-transmitting mechanism in the gear ratio requiring lower torque capacity. Finally, a solenoid valve regulating the pressure to engage the torque-transmitting mechanism is typically regulated at a very low pressure in the gear ratio requiring minimum torque capacity, and, therefore, the solenoid tolerance and hysteresis become a high percentage of the total pressure. This may make effective calibration of the apply pressure and, thus, the engagement of the torque-transmitting mechanism difficult.

One solution for achieving the different torque capacities required in different gear ratios at the same torque-transmitting mechanism is to use two different apply pistons having different areas with separate feed oils. Both of the pistons are used in the speed ratio requiring a higher torque capacity at the torque-transmitting mechanism and only one of the pistons is used in the speed ratio with lower torque capacity at the torque-transmitting mechanism. However, in a multi-speed transmission in which more than one torque-transmitting mechanism is likely to require such a dual area piston, an inordinate number of feed holes required in the transmission main shaft to feed the various apply pistons could necessitate an undesirable increase in shaft diameter. Also a rotating shaft seal is required for each apply piston, which may decrease transmission efficiency due to drag.

SUMMARY OF THE INVENTION

A method of controlling a torque-transmitting mechanism is provided that solves the problems associated with torque-transmitting mechanisms requiring different torque capacities in different speed ratios. The torque-transmitting mechanism is engagable by an apply piston having an apply surface and opposing reaction surface. The method includes providing structure forming a pressurizable reaction chamber at the reaction surface. The reaction chamber is pressurized to a first pressure during engagement of the torque-transmitting mechanism in a first speed ratio. The torque-transmitting mechanism has a first torque capacity when the reaction chamber is pressurized to the first pressure. The reaction chamber is pressurized to a second pressure greater than the first pressure during the engagement of the torque-transmitting mechanism in a second speed ratio. (As used in the claims, the "first speed ratio" and the "second speed ratio" are any two different speed ratios and are not either necessarily consecutive or the first and second forward speed ratios.) The torque-transmitting mechanism has a second torque capacity when the reaction chamber is pressurized to the second pressure. Because of the greater second pressure in the reaction chamber, a greater apply pressure may be applied to the apply surface to establish the second torque capacity than if a lower pressure (such as the first pressure) existed in the reaction chamber. Accordingly, with the greater apply pressure, engagement of the torque-transmitting mechanism in speed ratios requiring lower torque capacities is accomplished with greater control.

Thus, because pressure in the reaction chamber may be varied, different apply pressures may be used to achieve a desired torque capacity. Applying the piston to establish the first of the two speed ratios may include establishing a first apply pressure at the apply surface and applying a piston to establish the second of the two speed ratios may include establishing a second apply pressure at the apply surface. Although the first torque capacity may be greater than the second torque capacity, the second reaction pressure may be greater than the first reaction pressure, thus allowing a larger apply pressure to be used to establish the lower second torque capacity; that is, an apply pressure that is at a level easier to control.

The method may include providing structure forming the reaction chamber. A dam member, likely having an annular ring shape, positioned at the apply surface to create the reaction chamber therebetween may be used. The reaction chamber may also be sealed so that it is substantially leak free.

The reaction pressure may be controlled in stages depending upon the speed ratio. For instance, the method may include directing oil through a valve to thereby increase pressure of the oil from the first apply pressure to the second reaction pressure. For instance, the apply pressure may be directed through a pressure regulator valve to decrease pressure of the oil from the first apply pressure to the second reaction pressure, thereby allowing a greater apply pressure to work against the second reaction pressure in moving the apply piston in the speed ratio requiring the lower torque capacity. An additional valve may be employed in conjunction with the pressure regulator valve. This valve may be switched between a first position in which oil of the first reaction pressure is provided to the reaction chamber and a second position in which oil at the second reaction pressure is provided to the reaction chamber. Alternatively, the additional valve may be a solenoid valve which is calibrated to move in multiple increments, i.e., from a first position to a second position to a third position to thereby control the reaction pressure at a first reaction pressure, a second reaction pressure, a third reaction pressure, etc.

A method of controlling a torque-transmitting mechanism in a multi-speed transmission may also be described as establishing a first reaction pressure at the reaction surface during engagement of the torque-transmitting mechanism to establish the first of two speed ratios in which the torque-transmitting mechanism is engaged. The method may also include establishing a second reaction pressure at the reaction surface during engagement of the torque-transmitting mechanism to establish a second of the two speed ratios. The torque-transmitting mechanism has a first torque capacity in the first of the two speed ratios and a second torque capacity in the second of the two speed ratios. The apply piston is applied to establish the first speed ratio when the first reaction pressure is established and the second speed ratio when the second reaction pressure is established.

A clutch capacity control system that solves the problem of controlling a clutch engaged at different torque capacities in different speed ratios of the transmission includes a plurality of clutch plates engagable to transfer torque. An apply piston moveable via fluid pressure to engage the clutch plates is also included. A dam member at least partially establishes a fluid filled reaction chamber opposing movement of the apply piston. A valve is controllable to vary fluid pressure within the reaction chamber, thereby requiring a corresponding variance in pressure applied to the apply piston to establish a predetermined torque capacity at the clutch plates. Preferably, the apply piston has an apply surface and an opposing reaction surface and the reaction chamber is located at the reaction surface. Because the clutch capacity control system allows control of fluid pressure in the reaction chamber, a return spring such as is typically employed to return the applied piston upon disengagement of the clutch is not required and is not used in the control system. The control system may be used with equal success on rotating-type apply pistons and stationary-type apply pistons.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
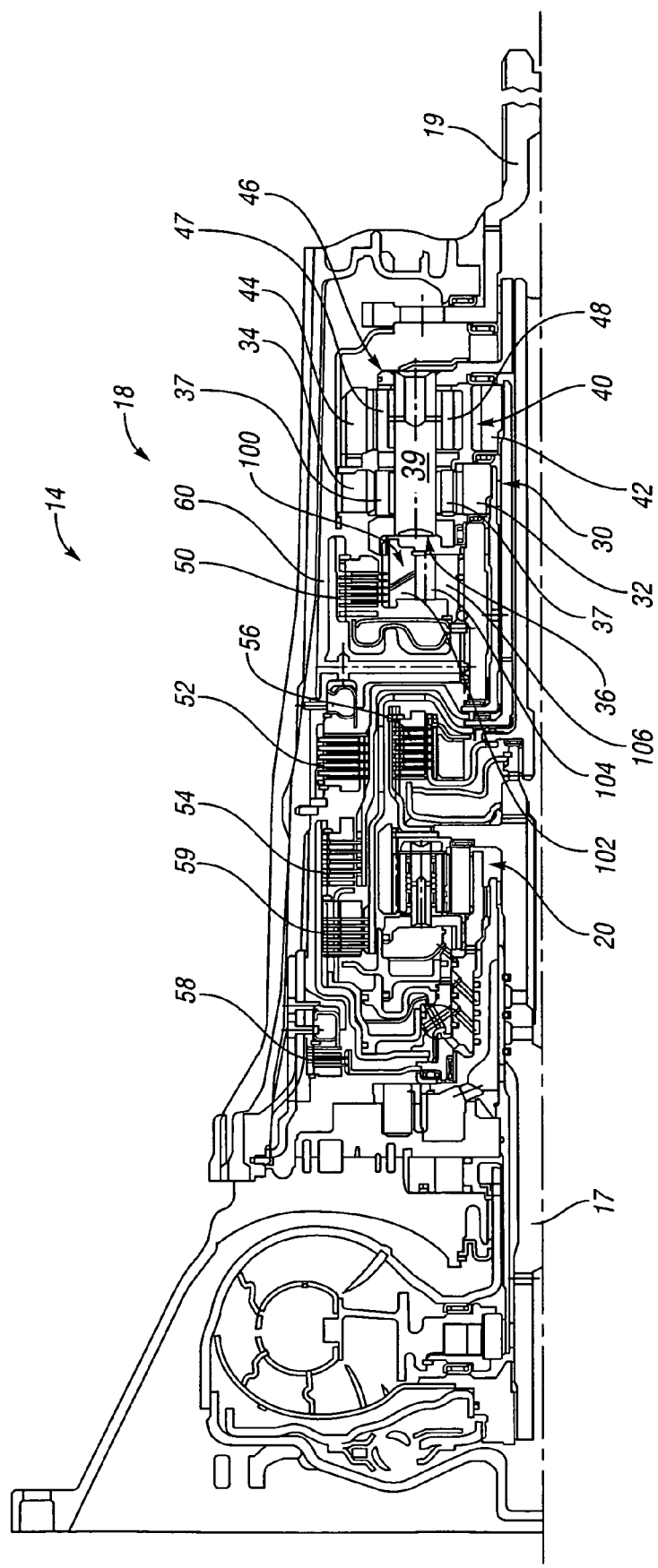
FIG. 1 is a schematic cross-sectional fragmentary view of a multi-speed transmission employing the clutch capacity control system of the present invention.

The planetary transmission 14 includes an input shaft 17 continuously connected with an engine and torque converter (not shown), a planetary gear arrangement 18, and an output shaft 19 continuously connected with a final drive mechanism (not shown). The planetary gear arrangement 18 includes three planetary gear sets 20, 30 and 40, viewed from left to right in FIG. 1.

Figure 2:
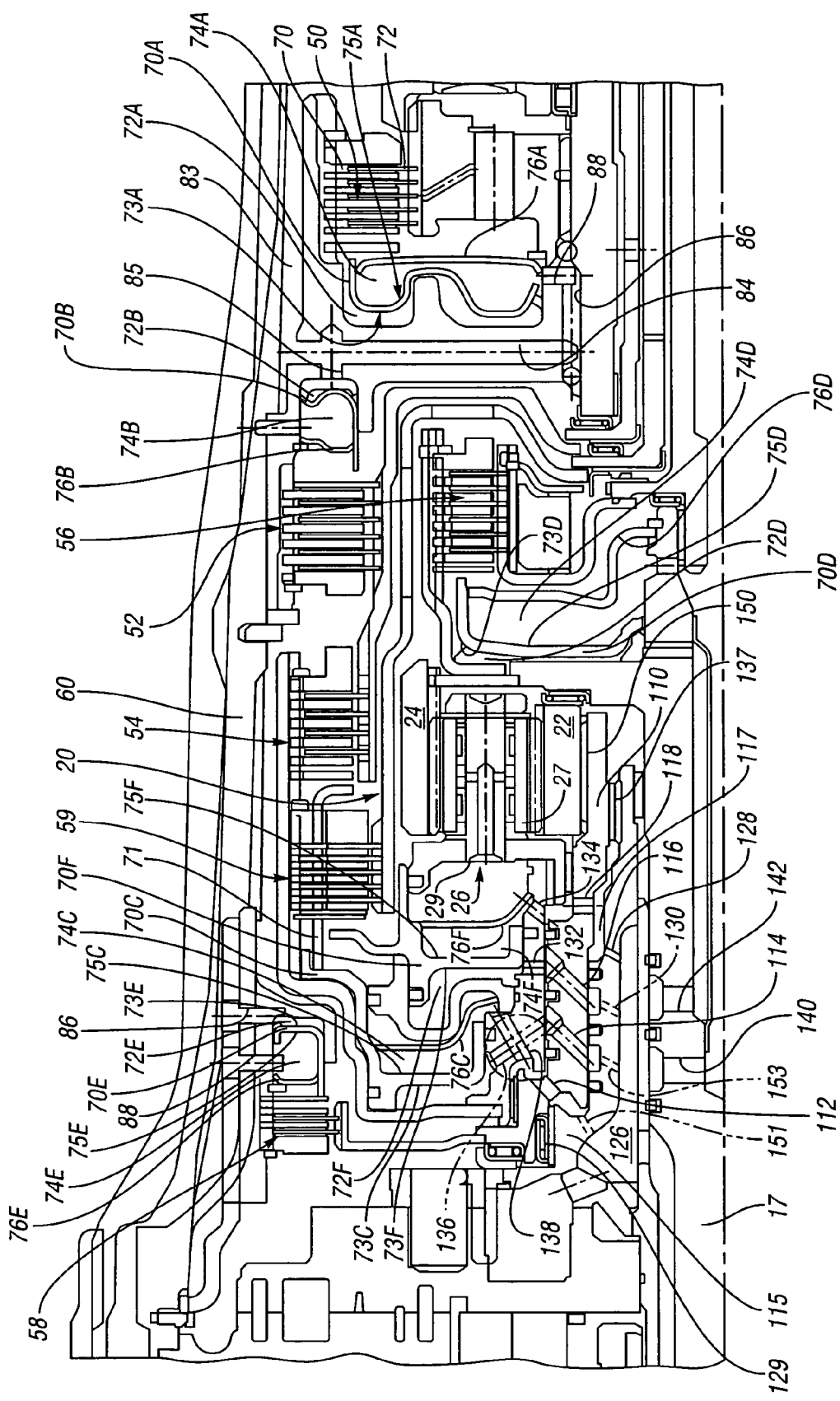
FIG. 2 is a schematic cross-sectional fragmentary view of the transmission of FIG. 1 illustrating clutch capacity control systems employed in relation to several different torque-transmitting mechanisms.

Referring to FIG. 2, the planetary gear set 20 includes a sun gear member 22, a ring gear member 24 and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

Referring again to FIG. 1, the planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44 and a planet carrier assembly member 46. The planet carrier assembly member 46 includes the pinion gears 37 which are long pinion gears interconnecting the planet carrier assembly member 36 with the planet carrier assembly member 46. The planet carrier assembly member 46 also includes a plurality of pinion gears 48 rotatably mounted on carrier member 39 to form a compound planetary gear set. The pinion gears 47 are disposed in meshing relationship with the sun gear member 42, and the pinion gears 48 are disposed in meshing relationship with the ring gear member 44. The pinion gears 47, 48 also mesh with each other. The ring gear member 44 may be formed integrally with the ring gear member 34 such that a single elongated ring gear member forms both components. Alternatively, the ring gear member 34 and ring gear member 44 may be formed separately and connected together (as shown in FIGS. 1 and 2). The planetary gear set 40 is a compound planetary gear set.

The planetary gear arrangement 18 also includes six torque-transmitting mechanisms 50, 52, 54, 56, 58, 59. The torque-transmitting mechanisms 50, 52, 58 are stationary-type torque-transmitting mechanisms, commonly termed brakes or reaction clutches. The torque-transmitting mechanisms 54, 56, 59 are rotating-type torque-transmitting mechanisms, commonly termed clutches. Each torque-transmitting mechanism 50, 52, 54, 56, 58 and 59 has two sets of axially spaced plates 70, 72 which may be placed in frictional contact with one another via an apply piston, as discussed below, to engage the torque-transmitting mechanism. Only the plates of the torque-transmitting mechanism 50 are labeled in FIG. 2; however, those skilled in the arts will readily recognize two sets of plates and their functions for each of the torque-transmitting mechanisms of FIGS. 1 and 2.

The input shaft 17 is continuously connected with the ring gear member 24 (see FIG. 2), and the output shaft 19 is continuously connected with the ring gear member 44 (see FIG. 1). The carrier member 39 is selectively connectable with the transmission housing 60 through the brake 50. The sun gear member 32 is selectively connectable with the transmission housing 60 through the brake 52. The carrier member 29 is selectively connectable with the sun gear member 32 through the clutch 54. The ring gear member 24 is selectively connectable with the carrier member 49 through the clutch 56. The sun gear member 22 is selectively connectable with the transmission housing 60 through the clutch 58. The carrier member 29 is selectively connectable with the sun gear member 42 through the clutch 59.

The torque-transmitting mechanisms 50, 52, 54, 56, 58, 59 are selectively engaged in combinations of three to provide seven forward speed ratios and one reverse speed ratio. The numerical values of these ratios, discussed below, assume the following ring gear/sun gear tooth ratio: 1.47 for the planetary gear set 20, 2.00 for the planetary gear set 30 and 1.47 for the planetary gear set 40. It should also be noted that the torque-transmitting mechanisms 50, 58 remain engaged through the neutral condition, thereby simplifying the forward/reverse interchange.

To establish the reverse speed ratio, the torque-transmitting mechanisms 50, 54 and 58 are engaged. The overall numerical value of the reverse speed ratio is −3.361.

The first forward speed ratio is established with the engagement of the torque-transmitting mechanisms 50, 58, 59. The overall numerical value of the first forward speed ratio is 4.419.

The second forward speed ratio is established with the engagement of the torque-transmitting mechanisms 52, 58, 59. The overall numerical value of the second forward speed ratio is 2.593.

The third forward speed ratio is established with the engagement of the torque-transmitting mechanisms 54, 58, 59. The overall numerical value of the third forward speed ratio is 1.680.

The fourth forward speed ratio is established with the engagement of the torque-transmitting mechanisms 56, 58, 59. The overall numerical value of the fourth forward speed ratio is 1.182.

The fifth forward speed ratio is established with the engagement of the torque-transmitting mechanisms 54, 56, 59. The numerical value of the fifth forward speed ratio is 1.

The sixth forward speed ratio is established with the engagement of the torque-transmitting mechanisms 54, 56, 58. The numerical value of the sixth forward speed ratio is 0.832.

The seventh forward speed ratio is established with the engagement of the torque-transmitting mechanisms 52, 56, 58. The numerical value of the seventh forward speed ratio is 0.667.

As shown, the torque-transmitting mechanism 50 is applied by the piston 70A by application of pressurized fluid in the apply chamber 72A. Oil is fed to the apply chamber 72A to create an apply pressure acting on an apply surface or area 73A of the piston 70A. A reaction chamber 74A is formed between the piston 70A and a dam member 76A. The dam member 76A sealingly interfaces with the piston 70A in a manner that seals the reaction chamber 74A such that it is essentially leak free and is able to maintain a controlled reaction pressure acting on a reaction area or surface 75A of the piston 70A. Thus, the reaction pressure counteracts some of the apply pressure. The greater the apply pressure for a given reaction pressure, the greater force is applied to engaged the plates 70, 72 resulting in a greater torque capacity (i.e., ability to transfer torque between planetary gear members (for a rotating-type clutch) or between a planet gear member and the transmission housing (for a brake)). Any increase in reaction pressure necessitates a corresponding increase in apply pressure in order to achieve a given torque capacity at the engaged plates 70, 72 of the torque-transmitting mechanism 50.

Because the pressure in the reaction chamber 74A may be controlled, no return spring is necessary to return the apply piston 70A to a nonapply/nonengaged position upon clutch release (i.e., upon controlled decrease in apply pressure causing disengagement of the plates 70, 72). None of the torque-transmitting mechanisms illustrated in FIGS. 1 and 2 and discussed herein require a piston return spring.

The torque-transmitting mechanism 52 is applied by the piston 70B a by application of pressurized fluid in the apply chamber 72B. A reaction chamber 74B similar in function to reaction chamber 74A is formed between the apply piston 70B and a dam member 76B similar in function to dam member 76A. Fluid having an apply pressure acts on an apply surface 73B of piston 70B and fluid in the reaction chamber 74B having a reaction pressure acts on a reaction surface 75B.

The torque-transmitting mechanism 54 is applied by the piston 70C as a result of application of pressurized fluid in the apply chamber 72C. The application arm 71 of the piston 70C is castellated to pass through the plates of the clutch 59 for applying the clutch 54. The reaction chamber 74C is formed between the apply piston 70C and a dam member 76C. The reaction chamber 74C is provided with pressure controlled fluid having a reaction pressure in order to counterbalance some of the applied force resulting from the apply pressure and thereby allowing a greater apply pressure to be utilized to obtain a desired torque capacity at the torque-transmitting mechanism 54. Fluid having an apply pressure acts on an apply surface 73C of the piston 70C and fluid in the reaction chamber 74C having a controlled reaction pressure acts on the reaction surface 75C. The reaction chamber 74C may also serve as a balance dam chamber to counterbalance centrifugal forces of fluid in the chamber 72B.

The torque-transmitting mechanism 56 is applied by the piston 70D when pressurized fluid is provided in the apply chamber 72D. A reaction chamber 74D similar in function to reaction chamber 74A is formed between the apply piston 70D and a dam member 76D similar in function to dam member 76A. Fluid having an apply pressure acts on an apply surface 73D of the piston 70D and fluid in the reaction chamber 74D having a controlled reaction pressure acts on the reaction surface 75D. The reaction chamber 74D also serves as a balance dam chamber to counterbalance centrifugal forces of the fluid in the apply chamber 72D.

The torque-transmitting mechanism 58 is applied by the piston 70E when pressurized fluid is provided in the apply chamber 72E. A reaction chamber 74E similar in function to reaction chamber 74A is formed between the apply piston 70E and a dam member 76E similar in function to dam member 76A. Fluid having an apply pressure acts on one side of the piston (on its apply surface 73E) and fluid having a controlled reaction pressure acts on the opposing side of piston (on its reaction surface 75E).

The torque-transmitting mechanism 59 is applied by the piston 70F when pressurized fluid is provided in the apply chamber 72F. A reaction chamber 74F similar in function to reaction chamber 74A is formed between the apply piston 70F and a dam member 76F similar in function to dam member 76A. Fluid having an apply pressure acts on one side of the piston (on its apply surface 73F) and fluid having a controlled reaction pressure acts on the opposing side of piston (on its reaction surface 75F). The reaction chamber 74F also serves as a balance dam chamber to counterbalance centrifugal forces of the fluid in the apply chamber 72F.

FIG. 1 also shows an optional freewheeler 100, including a race 102, a roller 104, and a cam 106. The freewheeler 100 is operative to selectively connect the carrier member 39 with the transmission housing 60.

Referring again to FIG. 2, The sun gear member 22 is supported on a rotatable hollow sun gear shaft 110, which has substantially radially-extending apertures 112, 114, 116, 118 which are positioned to provide fluid to the apply chamber 72C, reaction chamber 74E, apply chamber 72F, and reaction chamber 74F, respectively, as shown in FIG. 2. The apertures (also referred to as channels) 112, 114, 116 and 118 intersect the hollowed portion 117 of the sun gear shaft 110. Seals are provided adjacent the channels 112, 114, 116, 118 to prevent leakage therethrough. Seals and bearing 137 are operative to prevent leakage of the fluid which is fed into the channels 112, 114, 116, 118. The bearing 129 is also used as a seal. The chamber 126 feeds oil through the channels 128 into the channel 116. A plurality of similar circumferentially-spaced chambers are also utilized, with separate ones of these chambers feeding respective ones of channels 112, 114 and 118 via other channels 151, 153 and 130, shown in phantom, in the component 115). Channels 128, 130, 151 and 153 are radially and axially spaced from one another, each fluidly connected with a separate one of the circumferentially-spaced chambers such as chamber 126. From the channel 116, fluid enters the apply chamber 72F through the channel 132. From the channel 118, fluid enters the reaction chamber 74F through the channel 134. From the channel 114, fluid enters the apply chamber 72C through the channel 136. From the channel 112, fluid enters the reaction chamber 74C through the channel 138.

The chamber 126 (and the other circumferentially-spaced chambers) also feed the apply chamber 72D and reaction chamber 74D of the clutch 56 through channels 140, 142 in the input shaft 17. The channels 140, 142 are sealed by seals.

In this manner, fluid for applying the torque-transmitting mechanisms 54, 59 is fed through the sun gear shaft 110, which is splined to the sun gear 22 at the splines 150. The other torque-transmitting mechanism 50, 52 and 58 are also supplied with fluid to their respective apply chambers and reaction chambers in a controlled and leak free manner. With respect to the stationary-type torque-transmitting mechanisms 50, 52, 58, fluid is fed to the respective apply chambers and reaction chambers as follows. The apply chamber 72A for torque-transmitting mechanism 50 receives fluid from a transmission valve body (not shown) through a channel fluidly connected thereto but not visible in the cross-sectional view of FIG. 2. The reaction chamber receives fluid from the valve body through chamber 83 and, from there, through fluidly connected channels 84, 86, and 88. The apply chamber 72B for torque-transmitting mechanism 52 receives fluid from the valve body through a chamber similar to chamber 83 and circumferentially-spaced therefrom, which feeds oil to a radial channel circumferentially-spaced from channel 84 and at the same axial location as channel 84 and then through axial channel 85. Finally, fluid is supplied to apply chamber 72E for torque-transmitting mechanism 58 from the valve body and through radial channel 86. Fluid is supplied to the reaction chamber 74E for torque-transmitting mechanism 58 from the valve body through radially channel 88.

Figure 3:
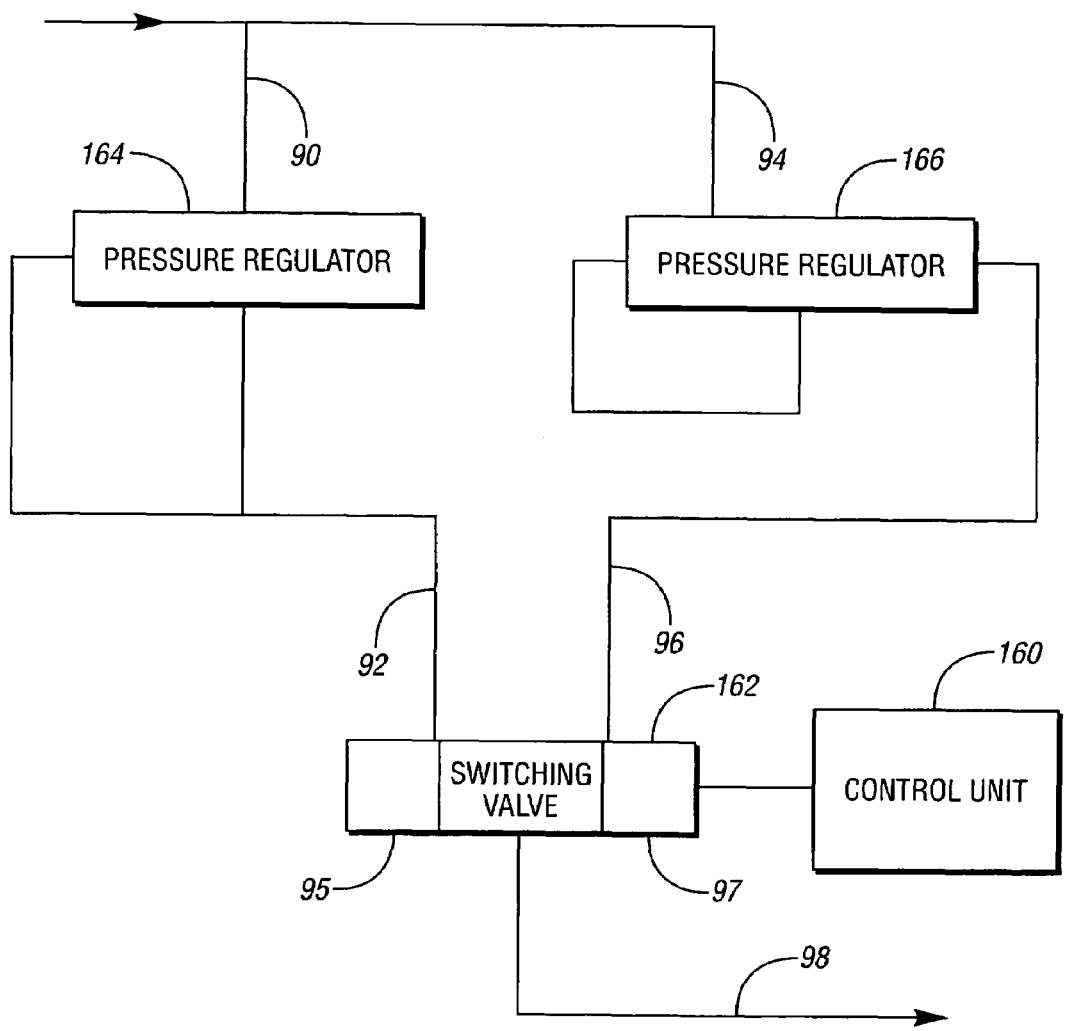
FIG. 3 is a schematic illustration of an exemplary arrangement of a control unit, pressure regulator valves and a switching valve for controlling fluid pressure in reaction chambers of the torque-transmitting mechanisms of FIGS. 1 and 2.

Fluid supplied from the valve body is supplied at individually controlled pressures to each of the respective apply and reaction chambers. Referring to FIG. 3, the fluid supplied to each of the torque-transmitting mechanisms is under the control of a control unit 160 which may be an electronic control unit for an entire vehicle or a separate control unit for the transmission. Because the reaction chambers must have a reaction pressure that may be varied separately from the apply pressure in each of the respective torque-transmitting mechanisms, fluid entering the various chambers must be controlled by the control unit 160 to obtain various pressures at the respective chambers. Thus, referring to FIG. 3, the control unit 160 is operatively connected to a switching valve 162. Fluid at a line pressure (e.g., 60 to 240 pounds per square inch) is routed through pressure regulator valve 164 to cause a pressure drop from the line pressure in channel 90 to one-half of line pressure in channel 92. A second pressure regulator valve 166 controls pressure routed at line pressure through channel 94 to a compensation oil pressure of about 13 pounds per square inch in channel 96. If it is desired to supply a reaction pressure that is a fraction of the apply pressure, such as one-half of the apply pressure, the switching valve 162 is controlled by the control unit 160 to move between a first position 95 (in which it blocks flow from channel 92 and allows flow at compensation oil pressure from channel 96) to a second position 97 (in which blocks channel 96 and permits flow at one-half of line pressure from channel 92 to channel 98. The fluid directed through the switching valve 162 is then routed from channel 98 to a respective reaction chamber of one or more of the torque-transmitting mechanisms.

In one embodiment, switching valve 162 is controlled to permit flow from channel 96 in lower speed ratios, where greater torque capacity may be required at a specific torque-transmitting mechanism (i.e., the first through fourth forward speed ratios described above) so that fluid may be supplied to one or more of the reaction chambers through channel 96 at a controlled compensation oil pressure. In higher speed ratios, where lower torque capacity may be required at a specific torque-transmitting mechanism, valve 164 is controlled to permit fluid to be supplied to a reaction chamber through channel 92 at one-half of line pressure. Thus, a greater apply pressure may be utilized in the higher speed ratios than if fluid at the compensation oil pressure were supplied to the reaction chamber, allowing greater control of the torque-transmitting mechanism, as described above.

While the best modes for carrying out the invention have been described in detail, those familiar with the art to which this invention relates will recognize various alternative designs and embodiments for practicing the invention within the scope of the appended claims.

The invention claimed is:

1. A method of controlling a torque-transmitting mechanism in a multi-speed transmission, the torque-transmitting mechanism being engagable via an apply piston having an apply surface and an opposing reaction surface, the torque-transmitting mechanism being engaged during two speed ratios, the method comprising:

positioning a dam member axially with respect to the apply piston such that the reaction surface of the apply piston and the dam member substantially form a reaction chamber and the apply piston moves axially with respect to the dam member when the torque-transmitting mechanism is engaged via the apply piston;

establishing a first reaction pressure at the reaction surface during engagement of the torque-transmitting mechanism to establish a first of said two speed ratios; and establishing a second reaction pressure at the reaction surface during engagement of the torque-transmitting mechanism to establish a second of said two speed ratios, thereby permitting greater control of the torque-transmitting mechanism in establishing different respective torque capacities of the torque-transmitting mechanism in the respective speed ratios.

2. The method of claim 1, further comprising:
after said establishing a first reaction pressure step, applying the apply piston to thereby engage the torque-transmitting mechanism to establish the first of said two speed ratios; and
after said establishing a second reaction pressure step, applying the apply piston to thereby engage the torque-transmitting mechanism to establish the second of said two speed ratios.

3. The method of claim 2, wherein applying the piston to establish the first speed ratio includes establishing a first apply pressure at the apply surface; and wherein applying the piston to establish the second speed ratio includes establishing a second apply pressure at the apply surface.

4. The method of claim 1, further comprising:
sealing the reaction chamber such that it is substantially leak-free.

5. The method of claim 1, further comprising:
directing oil through a first valve to thereby decrease a pressure of oil provided in the reaction chamber from the first apply pressure to the second reaction pressure.

6. The method of claim 5, further comprising:
switching a second valve between a first position, in which oil at the first reaction pressure is provided in the reaction chamber, and a second position in which oil at the second reaction pressure is provided in the reaction chamber.

7. The method of claim 1, wherein said establishing said first reaction pressure step and said establishing said second reaction pressure step include controlling a valve operable for providing oil at said first and second reaction pressures.

8. A method of controlling a torque-transmitting mechanism engagable by an apply piston having an apply surface and an opposing reaction surface in a multi-speed transmission, comprising:
providing structure forming a pressurizable reaction chamber at the reaction surface;
pressurizing the reaction chamber to a first reaction pressure during engagement of the torque-transmitting mechanism to establish a first speed ratio in which the torque-transmitting mechanism is characterized by a first torque capacity;
pressurizing the reaction chamber to a second reaction pressure greater than said first reaction pressure during engagement of the torque-transmitting mechanism to establish a second speed ratio in which the torque-transmitting mechanism is characterized by a second torque capacity less than the first torque capacity, thereby permitting a greater apply pressure to be applied at the apply surface to establish the second torque capacity.

9. A clutch capacity control system comprising:
a plurality of clutch plates engagable to transfer torque;
an apply piston having an apply surface and an opposing reaction surface and being moveable via fluid pressure at the apply surface to engage the clutch plates;
a dam member at least partially establishing a fluid filled reaction chamber acting on the reaction surface and opposing movement of the apply piston; and
a valve controllable to vary fluid pressure within the reaction chamber; wherein the valve is configured to provide a first reaction pressure within the reaction chamber during engagement of the torque-transmitting mechanism to establish a first speed ratio in which the torque-transmitting mechanism is characterized by a first torque capacity, and to provide a second reaction pressure greater than said first reaction pressure during engagement of the torque-transmitting mechanism to establish a second speed ratio in which the torque-transmitting mechanism is characterized by a second torque capacity less than the first torque capacity.

10. The clutch capacity control system of claim 9, wherein the apply piston has a reaction surface opposing the apply surface, the reaction chamber being at the reaction surface.

11. The clutch capacity control system of claim 9, wherein the apply piston is moveable via fluid pressure to disengage the clutch plates; and
wherein the control system is characterized by an absence of a return spring.

* * * * *